United States Patent
Graneto, III (10) Patent No.: US 8,498,103 B2
(45) Date of Patent: Jul. 30, 2013

(54) COVER FOR PORTABLE COMPUTING DEVICE

(76) Inventor: Joseph A. Graneto, III, St. Charles, MO (US)

(*) Notice: Subject to any disclaimer, the term of this patent is extended or adjusted under 35 U.S.C. 154(b) by 28 days.

(21) Appl. No.: 13/076,971

(22) Filed: Mar. 31, 2011

(65) Prior Publication Data

US 2012/0250242 A1 Oct. 4, 2012

(51) Int. Cl.
*G06F 1/16* (2006.01)

(52) U.S. Cl.
USPC .............. 361/679.3; 361/679.02; 361/679.55; 361/679.56; 206/320; 428/41.7; 345/173; 345/174

(58) Field of Classification Search
USPC ...................................... 361/679.3
See application file for complete search history.

(56) References Cited

U.S. PATENT DOCUMENTS

| | | | | |
|---|---|---|---|---|
| 5,092,459 A | * | 3/1992 | Uljanic et al. | 206/320 |
| 6,273,252 B1 | * | 8/2001 | Mitchell | 206/320 |
| 6,659,274 B2 | * | 12/2003 | Enners | 206/305 |
| 6,914,774 B1 | * | 7/2005 | Albertini et al. | 361/679.09 |
| 7,079,119 B2 | * | 7/2006 | Hanson et al. | 345/175 |
| 7,403,191 B2 | * | 7/2008 | Sinclair | 345/173 |
| 7,663,879 B2 | * | 2/2010 | Richardson et al. | 361/679.56 |
| 8,044,942 B1 | * | 10/2011 | Leonhard et al. | 345/173 |
| 2001/0012769 A1 | * | 8/2001 | Sirola et al. | 455/90 |
| 2003/0160754 A1 | * | 8/2003 | Hanson et al. | 345/156 |
| 2004/0246386 A1 | * | 12/2004 | Thomas et al. | 348/818 |
| 2007/0148409 A1 | * | 6/2007 | Rios et al. | 428/167 |
| 2009/0257189 A1 | * | 10/2009 | Wang et al. | 361/679.56 |
| 2010/0200456 A1 | * | 8/2010 | Parkinson | 206/701 |
| 2010/0238119 A1 | * | 9/2010 | Dubrovsky et al. | 345/169 |
| 2011/0157056 A1 | * | 6/2011 | Karpfinger | 345/173 |

OTHER PUBLICATIONS

Stylus-R-Us—Raised Home Button; www.beststylus.com/home-button---buy.html; 7 pages.

* cited by examiner

*Primary Examiner* — Anthony Q Edwards
(74) *Attorney, Agent, or Firm* — Harness, Dickey & Pierce, P.L.C.

(57) ABSTRACT

A cover for a screen of a portable computing device having a physical button recessed into the screen is provided. The cover comprises a transparent member, a protrusion, and a tactile feature. The transparent member has a first surface positioned adjacent the screen of the device and an opposing second surface. The protrusion is adjacent the first surface of the transparent member in a position such that the protrusion engages the physical button. The protrusion has a shape such that it is in registry with the physical button. The tactile feature is formed in the second surface of the transparent member opposite the protrusion. The transparent member can be formed from a material which limits the viewing angle of the screen of the portable computing device and displays images such as company logos, slogans, advertising, or photographs to users viewing the screen at angles greater than the viewing angle.

20 Claims, 6 Drawing Sheets

COVER FOR PORTABLE COMPUTING DEVICE

FIELD

The field of the disclosure relates generally to covers for protecting screens of portable computing devices and, more specifically, to a cover having a protrusion on a surface adjacent the screen of the computing device.

BACKGROUND

Display screens in portable computing devices continue to increase in size. These screens are used to both output graphical data to a user (e.g., text, images, etc) and receive input from the user (e.g., the screen is capacitive touch screen panel). These screens typically have an outer, glass-like layer that is susceptible to scratching. Users will often place a transparent cover over the screen to protect the screen from scratches.

Many portable computing devices have physical buttons proximate their displays. In certain devices, a screen has a portion for displaying graphical data and another portion surrounding this portion that are coplanar. In such devices, the physical buttons are located in the coplanar surface. Some transparent covers cover these buttons, thus making it difficult for a user to actuate the button. Other covers have a hole formed therein to provide the user access to the button. These holes in the transparent covers are unsightly and uncomfortable to the touch. Dirt, grime, and other debris can build up around this opening in the transparent cover. Moreover, the transparent cover can easily separate from the screen around the opening, requiring replacement of the cover.

Accordingly, a transparent cover is needed for portable computing devices that provides ready access to recessed buttons in the screens of such devices without the need to form an opening in the covers.

This Background section is intended to introduce the reader to various aspects of art that may be related to various aspects of the present disclosure, which are described and/or claimed below. This discussion is believed to be helpful in providing the reader with background information to facilitate a better understanding of the various aspects of the present disclosure. Accordingly, it should be understood that these statements are to be read in this light, and not as admissions of prior art.

BRIEF DESCRIPTION OF THE INVENTION

In one aspect, a cover for a screen of a portable computing device is described. The portable computing device has a physical button recessed into the screen and is configured to display graphical and other data on the screen. The cover comprises a transparent member and protrusion. The transparent member has a length and a width substantially the same as a length and a width of the screen of the device. The transparent member has a first surface positioned adjacent the screen of the device when in use and a second surface opposite the first surface. The protrusion is connected to the first surface of the transparent member in a position such that the protrusion engages the physical button recessed into the screen of the device. The protrusion has a shape complimentary to the physical button.

In another aspect, a cover for a screen of a portable computing device is described. The portable computing device has a physical button proximate the screen. The cover comprises a transparent member, a protrusion, and a tactile feature. The transparent member has a first surface positioned adjacent the screen of the device when in use and a second surface opposite the first surface. The protrusion is adjacent the first surface of the transparent member in a position such that the protrusion engages the physical button of the device. The protrusion has a shape such that the protrusion is in registry with the physical button. The tactile feature is formed in the second surface of the transparent member opposite the protrusion. The tactile feature has a texture different than a remainder of the second surface of the transparent member.

In another aspect, a system comprising a portable computing device having a screen for displaying information and a cover for positioning adjacent the screen is described. The portable computing device has a physical button recessed into the screen and the screen has a length and a width. The cover comprises a transparent member and a protrusion. The transparent member has a length and a width substantially the same as the length and the width of the screen of the device. The transparent member has a first surface positioned adjacent the screen of the device when in use and a second surface opposite the first surface. The protrusion is adjacent the first surface of the transparent member in a position such that the protrusion engages the physical button recessed into the screen of the device. The protrusion has a shape complimentary to the physical button.

Various refinements exist of the features noted in relation to the above-mentioned aspects. Further features may also be incorporated in the above-mentioned aspects as well. These refinements and additional features may exist individually or in any combination. For instance, various features discussed below in relation to any of the illustrated embodiments may be incorporated into any of the above-described aspects, alone or in any combination.

BRIEF DESCRIPTION OF THE DRAWINGS

Like reference symbols in the various drawings indicate like elements.

DETAILED DESCRIPTION OF THE INVENTION

The embodiments described herein relate to transparent covers for portable computing devices. Such devices include, for example, cell phones, smart phones, personal digital assistants, portable digital music players, portable gaming devices, and any other portable computing device that has a screen used to output graphical data to a user. Moreover, in some embodiments the portable computing devices have a screen surface and an area surrounding the screen surface that is coplanar. In such devices, the physical buttons (i.e., buttons which are manually actuated by a user) are located in the coplanar surface, but recessed below the coplanar surface. Such buttons thus do not protrude above the surface of the screens.

Figure 1:
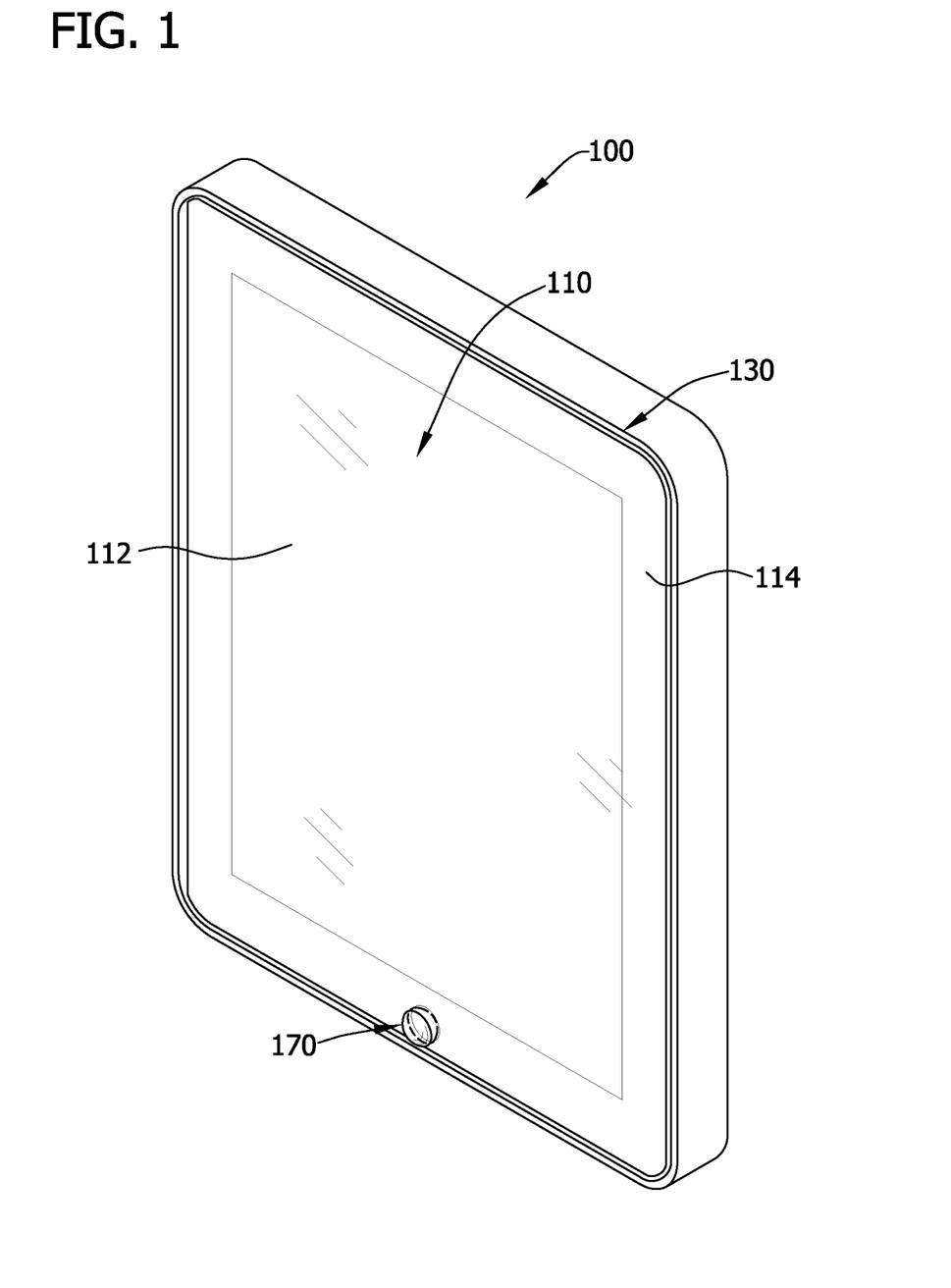
FIG. 1 is a perspective view of a portable computing device and a transparent cover overlying a screen of the device.
Figure 2:
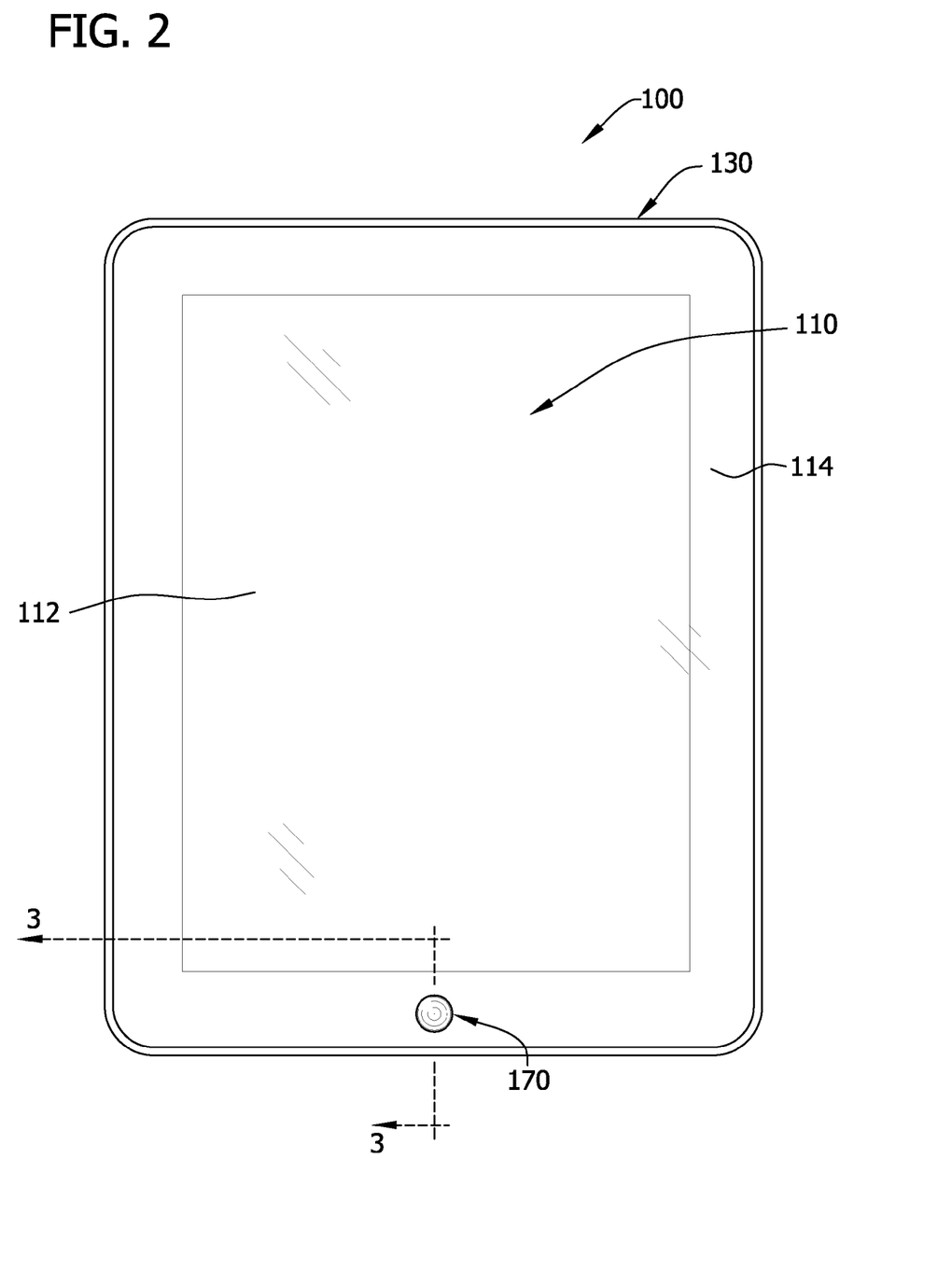
FIG. 2 is a top plan view of FIG. 1.

With reference now to the drawings, and in particular FIGS. 1 and 2, an exemplary portable computing device is indicated generally at 100 and is referred to herein as "the device". The device 100 has a screen 110 for the graphical output of data to a user. In the exemplary embodiment, a portion 112 of the surface area of the screen 110 is configured to output graphical data to the user, although the portion of the screen configured output graphical data may be sized differently. A surrounding portion 114 of the screen 110 does not output graphical data. The portions 112, 114 of the screen 110 are coplanar. In the exemplary embodiment, the screen 110 is a capacitive touch screen panel and is thus operable as input component of the device 100. A user is able to input data by touching the screen 110 with a portion of their body (e.g., a finger tip). In other embodiments, the screen only functions as an output device and is not an input component of the device.

Figure 3:
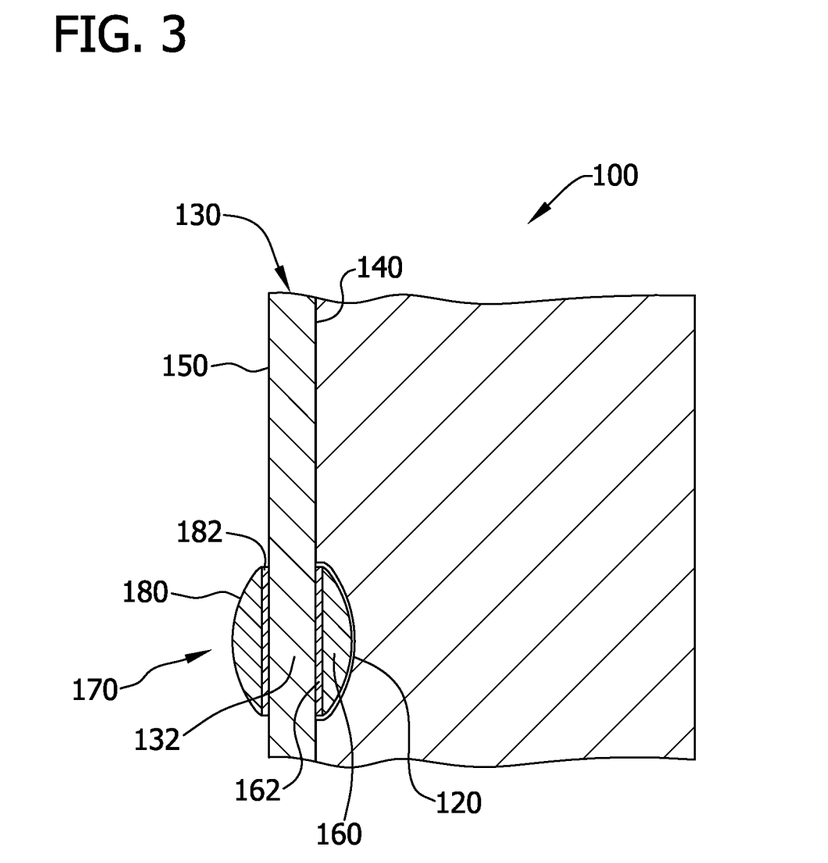
FIG. 3 is a cross-sectional view of FIG. 2 taken along the 3-3 line showing a first embodiment of the transparent cover.
Figure 4:
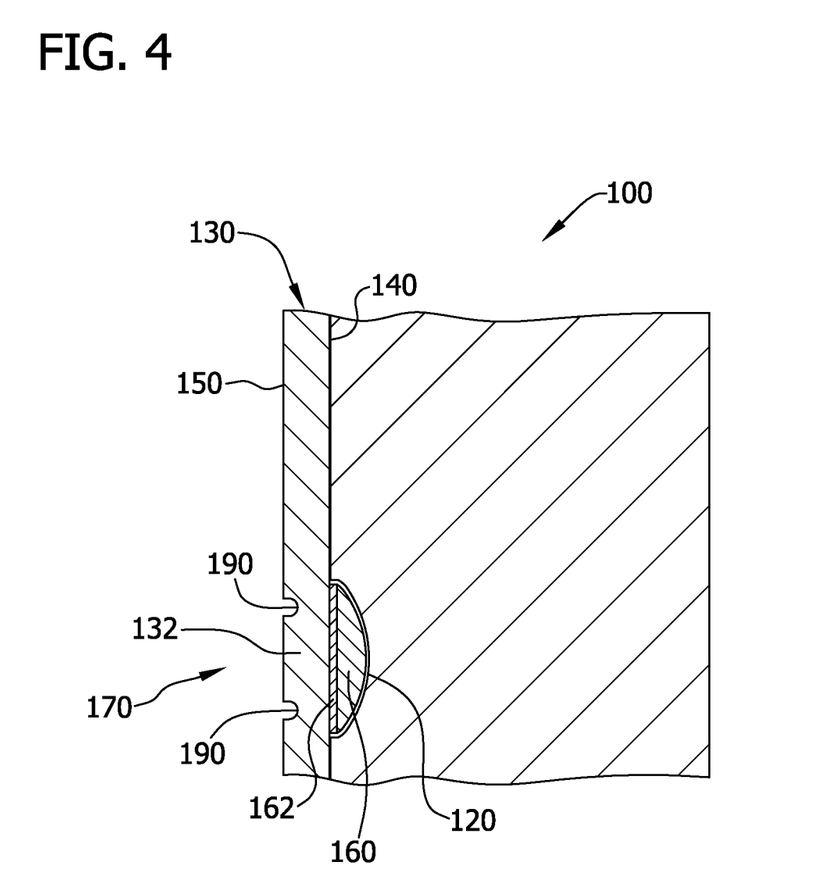
FIG. 4 is a cross-sectional view similar to FIG. 3 showing a second embodiment of the transparent cover.
Figure 5:
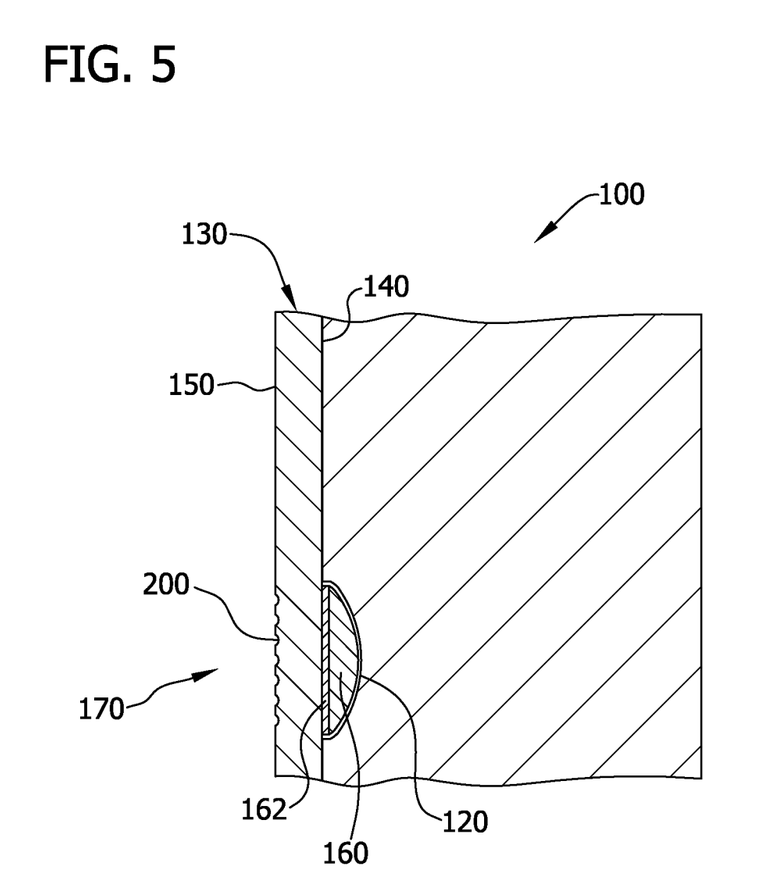
FIG. 5 is a cross-sectional view similar to FIG. 3 showing a third embodiment of the transparent cover.

A physical button 120 is located in the surrounding portion 114 of the screen 110 of the device 100 and is thus proximate the screen. The button 120 can positioned differently without departing from the scope of the embodiments. The button 120 is "recessed" and does not protrude above the surface of the portion 114 in the exemplary embodiment. In other embodiments, described below, the button 120 may protrude above the coplanar surface of the portions 112, 114 of the screen. In use, the button 120 is actuated by a user depressing the button. As shown in FIGS. 3-5, embodiments of such a button 120 may include a curved profile such that the button has a greatest depth at its center which gradually increases towards edges of the button. While the device 100 has one such recessed button 120, other embodiments may have additional recessed buttons. Moreover, the placement of the button 120 with respect to the screen 110 of the device 100 is exemplary in nature and can be changed without departing from the scope of the embodiments.

A transparent member 130 (broadly, a member) is positioned atop the screen 110 of the device 100. As shown in FIGS. 3-5, the member 130 has a first surface 140 positioned adjacent the screen 110 of the device 100 when in use and a second surface 150 opposite the first surface. The member 130 has a length and a width substantially the same as a length and width of the screen 110 of the device 100. The member 130 can have a length and width less than that of the screen 110 and such dimensions still be substantially the same. The member 130 is connected to the device 100 by a suitable adhesive in the exemplary embodiment. In other embodiments, the member 130 is connected to the screen by different suitable mechanisms (e.g., static electricity).

The member 130 is formed from a material that is substantially transparent and suitably operable to protect the screen 110 from scratches or other abrasions. Example materials include plastic films. Such materials also do not interfere with operation of capacitive touch screen panels in embodiments that utilize such systems.

The member 130 may also be formed from a resilient material such that a portion 132 (FIG. 3) of the member overlying the button 120 returns to its initial, un-deflected position after actuation by a user. Only the portion 132 may be resilient or the remainder or other portions of the member 130 may be resilient as well. The material used to form the member 130 may also be a view limiting material, as discussed below in greater detail.

A protrusion 160 (FIGS. 3-5) is connected to the first surface 140 of the member 130 in a position such that the protrusion engages the button 120 in the screen 110 of the device 100. The protrusion 160 has a curved shape that is complimentary to the curved profile of the button 120 such that the protrusion and button are in registry with one another when in use. A suitably rigid material is used to form the protrusion 160 that is not substantially compressed during use. In the exemplary embodiment, the protrusion 160 is connected to the member with a suitable layer 162 of adhesive. In other embodiments, the protrusion 160 is integrally formed with the member 130 such that the member and the protrusion are a single piece. Together, the protrusion 160 and the member 130 form a cover for the device 100.

In the exemplary embodiment, a tactile feature (indicated generally at 170) is formed in the second surface 150 of the member 130 opposite the protrusion 160. The tactile feature 170 generally has a texture different than a remainder of the second surface 150 of the member 130. As such, the user is able to differentiate by touch the location of the tactile feature 170 on the second surface 150 of the member 130. The three embodiments of the tactile features 170 shown in FIGS. 3-5 are exemplary in nature, and it should be understood that any tactile feature that has a texture different than the remainder of the second surface 150 of the member may be used.

FIG. 3-5 illustrate different embodiments of the tactile feature 170. In the exemplary embodiments, the tactile features 170 have overall dimensions (i.e., length, width or radius when viewed from the perspective of FIG. 2) that are substantially similar to that of the button 120. In other embodiments, the tactile features 170 may be smaller or larger overall dimensions that the button 120. In the first embodiment shown in FIG. 3, the tactile feature 170 comprises a raised bead 180 (broadly, a raised member) connected to the second surface 150 of the member 130. The raised bead 180 may be connected to the second surface 150 with a suitable layer 182 of adhesive or it may be integrally formed with the member 130. While the raised bead 180 is shown as having a height that is substantially similar to that of the protrusion 160, the height may be different without departing from the scope of the embodiments.

In the embodiment of FIG. 4, that tactile feature 170 comprises a circular indentation 190 formed in the second surface 150 of the member 130. The indentation 190 may be formed in the second surface 150 through any suitable manufacturing procedure. The indentation 150 is circular in shape and has a radius substantially similar to that of the protrusion 160 in the exemplary embodiment. In other embodiments, the indentation 190 is differently shaped (e.g., rectangular or oblong) and/or differently sized than the protrusion 160. Moreover, the indentation 190 may be discontinuous and have breaks formed therein.

FIG. 5 depicts a third embodiment of the tactile feature 170 in the form an etched surface 200. The second surface 150 of the member 130 is etched to form the etched surface 200 according to any suitable manufacturing procedure. The etched surface 200 is generally circular in shape and has a radius substantially similar to that of the protrusion 160 in the exemplary embodiment. In other embodiments, the etched surface 200 is differently shaped (e.g., rectangular or oblong) and/or differently sized than the protrusion 160.

In use, a user presses the tactile feature 170 with a portion of their body (i.e., a finger tip) to actuate the button 120. When pressed, the tactile feature 170 and the member deflect downward. This downward deflection also downwardly deflects the protrusion 160. The protrusion 160 then contacts the button 120 and depresses the button. After the user removes their finger tip from the tactile surface 170, the member 130 returns to its initial un-deflected state such that the protrusion 160 does not depress the button 120.

In some embodiments, the button 120 is not recessed in the screen 110 and instead protrudes upwardly from the screen. In such embodiments the first surface 140 has a void formed therein that corresponds in position and shape to the button such that the button is received in the void. A tactile feature (e.g., the same as or similar to the tactile feature 170) is positioned on the second surface 150 of the member 130 opposite the void.

As referenced above, the member 130 may be formed from a view limiting material having a plurality of micro louvers formed therein. The view limiting material restricts of the graphical data displayed on the screen 110 of the device 100 to a predetermined viewing angle measured from a line extending perpendicular to the screen. For example, the predetermined viewing angle may be 12 degrees, such that a user can view the graphical data displayed on the screen 110 at angle of 12 degrees from perpendicular with respect to the screen. When a user attempts to view the screen 110 at angles greater than 12 degrees, they are unable to do so and instead are shown a predetermined image or pattern.

Previous view limiting materials merely presented a blackened or opaque image to users attempting to view the graphical data displayed on the screen 110 at angles greater than the viewing angle. The embodiments described herein, however, are operable to display a variety of geometric patterns or images to a similar situated user. Such images can include company logos, slogans, advertising, or photographs.

Figure 6:
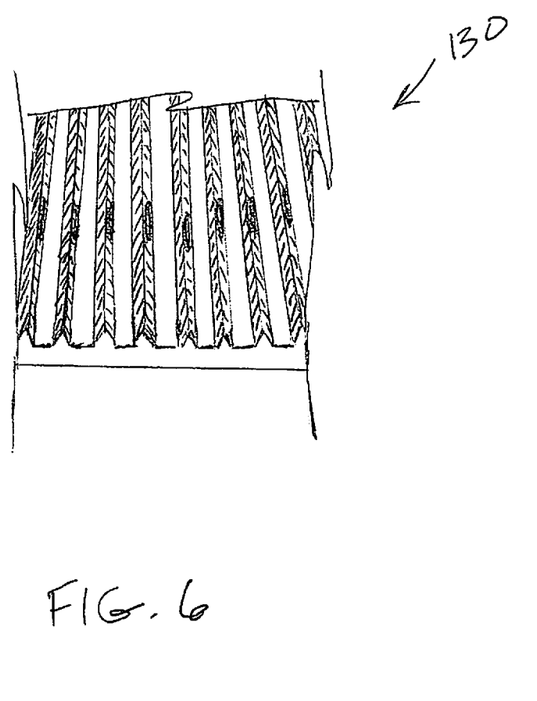
FIG. 6 is a partial top perspective cross-sectional view of one embodiment of a transparent member.

Moreover, in some embodiments the transparent member 130 may be formed from a lenticular material to allow different images to be viewed by a user positioned at different viewing angles. In such an embodiment, e.g., as shown in FIG. 6, the central angles (i.e., those less than the predetermined viewing angle) of the lenticular material are transparent (i.e., an image is not printed thereon), while the remaining angles have images printed thereon. Accordingly, a user attempting to view the screen 110 within the central angles is able to see the graphical data output by the screen. However, a user attempting to view the screen 110 at angles greater than the central angles is instead presented with the printed images.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A cover for a screen of a portable computing device, the portable computing device having a physical button recessed into the screen, the portable computing device configured to display graphical and other data on the screen, the cover comprising:
   a transparent member having a length and a width substantially the same as a length and a width of the screen of the device, the transparent member having a first surface positioned adjacent the screen of the device when in use and a second surface opposite the first surface; and
   a protrusion connected to the first surface of the transparent member in a position such that the protrusion engages the physical button recessed into the screen of the device, the protrusion having a shape complementary to a shape of the physical button.

2. The cover of claim 1 wherein the transparent member restricts, to a predetermined viewing angle, viewing by a user of the graphical data displayed on the screen of the device.

3. The cover of claim 2 wherein the transparent member is configured to display a predefined image when viewed by a user at an angle greater than the viewing angle.

4. The cover of claim 1 wherein at least a portion of the transparent member adjacent the protrusion is resilient.

5. The cover of claim 1 further comprising a tactile feature formed in the second surface of the transparent member opposite the protrusion.

6. The cover of claim 5 wherein the tactile feature has a texture different than a remainder of the second surface of the transparent member.

7. The cover of claim 5 wherein the tactile feature comprises a raised member.

8. The cover of claim 5 wherein the tactile feature comprises an indentation formed in the second surface of the transparent member.

9. The cover of claim 5 wherein the tactile feature comprises an etched surface.

10. A cover for a screen of a portable computing device, the portable computing device having a physical button proximate the screen, the cover comprising:
    a transparent member having a first surface positioned adjacent the screen of the device when in use and a second surface opposite the first surface;
    a protrusion adjacent the first surface of the transparent member in a position such that the protrusion engages the physical button of the device, the protrusion and the physical button having complementary shapes such that the shape of the protrusion is in registry with a recess of the physical button; and
    a tactile feature formed in the second surface of the transparent member opposite the protrusion, the tactile feature having a texture different than a remainder of the second surface of the transparent member.

11. The cover of claim 10 wherein the physical button is recessed into the screen of the device.

12. The cover of claim 10 wherein the transparent member restricts, to a predetermined viewing angle, viewing by a user of the graphical data displayed on the screen of the device.

13. The cover of claim 12 wherein the transparent member is configured to display a predefined image when viewed by a user at an angle greater than the viewing angle.

14. The cover of claim 10 wherein at least a portion of the transparent member adjacent the protrusion is resilient.

15. The cover of claim 10 wherein the tactile feature comprises a raised member.

16. The cover of claim 10 wherein the tactile feature comprises an indentation formed in the second surface of the transparent member.

17. The cover of claim 10 wherein the tactile feature comprises an etched surface.

18. A system comprising:
    a portable computing device having a screen for displaying information, the portable computing device having a physical button recessed into the screen, the screen having a length and a width;
    a cover for positioning adjacent the screen, the cover comprising:
       a transparent member having a length and a width substantially the same as the length and the width of the screen of the device, the transparent member having a first surface positioned adjacent the screen of the device when in use and a second surface opposite the first surface; and
       a protrusion adjacent the first surface of the transparent member in a position such that the protrusion engages the physical button recessed into the screen of the device, the protrusion having a shape complementary to a recess shape of the physical button.

19. The system of claim 18 wherein the transparent member restricts, to a predetermined viewing angle, viewing by a user of the graphical data displayed on the screen of the device.

20. The system of claim 18 further comprising a tactile feature formed in the second surface of the transparent member opposite the protrusion, the tactile feature having a texture different than a remainder of the second surface of the transparent member.

* * * * *